(12) United States Patent
Benim et al.

(10) Patent No.: US 9,433,154 B2
(45) Date of Patent: Sep. 6, 2016

(54) BIODEGRADABLE LANDSCAPE FABRIC

(75) Inventors: Thomas Edward Benim, Goodlettsville, TN (US); Bruce A Yost, Landenberg, PA (US)

(73) Assignee: JACOB HOLM & SONS AG, Basel (CH)

( * ) Notice: Subject to any disclaimer, the term of this patent is extended or adjusted under 35 U.S.C. 154(b) by 0 days.

(21) Appl. No.: 13/552,772

(22) Filed: Jul. 19, 2012

(65) Prior Publication Data

US 2013/0180167 A1 Jul. 18, 2013

Related U.S. Application Data

(60) Provisional application No. 61/510,533, filed on Jul. 22, 2011.

(51) Int. Cl.
*A01G 13/02* (2006.01)
*A01G 13/00* (2006.01)

(52) U.S. Cl.
CPC ................................ *A01G 13/0268* (2013.01)

(58) Field of Classification Search
CPC .......... D04H 1/25; D04H 1/28; D04H 1/465; D04H 3/11; D04H 3/013; A01G 13/0268; A01G 13/0281
USPC ..... 47/101 R, 101 F, 9, 20.1, 32.3, 31, 31.1, 47/1.01 R, 1.01 F; 442/408
See application file for complete search history.

(56) References Cited

U.S. PATENT DOCUMENTS

| | | | | |
|---|---|---|---|---|
| 3,303,609 | A | * | 2/1967 | MacHenry ........................ 47/9 |
| 3,485,706 | A | * | 12/1969 | Evans ........................... 428/134 |
| 3,493,462 | A | | 2/1970 | Bunting et al. |
| 3,508,308 | A | | 4/1970 | Bunting et al. |
| 3,560,326 | A | | 2/1971 | Bunting, Jr. et al. |
| 3,620,903 | A | | 11/1971 | Bunting, Jr. et al. |
| 4,041,203 | A | * | 8/1977 | Brock et al. .................. 428/157 |
| 4,215,692 | A | * | 8/1980 | Levesque ..................... 604/374 |
| 4,442,161 | A | | 4/1984 | Kirayoglu et al. |
| 4,808,467 | A | * | 2/1989 | Suskind et al. .............. 442/384 |
| 5,320,900 | A | * | 6/1994 | Oathout ....................... 442/408 |
| 5,587,225 | A | * | 12/1996 | Griesbach et al. ........... 428/198 |
| 5,683,794 | A | * | 11/1997 | Wadsworth et al. ......... 442/382 |
| 6,784,126 | B2 | * | 8/2004 | Everhart et al. .............. 442/401 |
| 7,867,359 | B2 | * | 1/2011 | Medoff ........................... 162/50 |
| 8,187,421 | B2 | * | 5/2012 | Sumnicht et al. ............ 162/146 |
| 8,318,062 | B2 | * | 11/2012 | Sellars et al. ................. 264/112 |
| 8,389,427 | B2 | * | 3/2013 | Gustafsson et al. .......... 442/408 |
| 2002/0035354 | A1 | * | 3/2002 | Mirle et al. ............... 604/385.01 |
| 2003/0003832 | A1 | * | 1/2003 | Childs et al. ................. 442/381 |
| 2003/0114071 | A1 | * | 6/2003 | Everhart et al. ............. 442/414 |
| 2003/0207636 | A1 | * | 11/2003 | Gosavi et al. ................ 442/327 |
| 2005/0136778 | A1 | * | 6/2005 | Thomaschefsky et al. .. 442/408 |
| 2008/0268205 | A1 | * | 10/2008 | Vogel et al. .................. 428/156 |
| 2010/0167018 | A1 | * | 7/2010 | Luo et al. ..................... 428/172 |

* cited by examiner

*Primary Examiner* — Kristen C Hayes
*Assistant Examiner* — Ebony Evans
(74) *Attorney, Agent, or Firm* — Middleton Reutlinger

(57) ABSTRACT

The present invention relates to a biodegradable landscape fabric comprising spunlaced cellulosic fibers which comprise 0% to 75% wood pulp fibers and 25% to 100% regenerated cellulosic fibers without fiber binding materials and may further comprise a colorant.

5 Claims, No Drawings

BIODEGRADABLE LANDSCAPE FABRIC

BACKGROUND OF THE INVENTION

1. Field of the Invention

This invention relates to a biodegradable landscape or garden fabric for inhibiting weed growth, improving moisture retention and improving appearance in garden environments.

2. Description of the Related Art

Mulches of various sorts and landscape fabrics have been used for years to help enhance landscapes and vegetable gardens by inhibiting weed growth and improving moisture retention. Natural materials such as bark, leaves, compost, and even rocks are commonly used. Synthetic fabrics made from spunbond nonwovens and films can also be used.

Paper is commonly used alone for vegetable gardens, and under decorative mulches in landscapes. Newspapers are often used as they are readily available. This method works but is unsightly and tedious to apply. In recent years manufacturers have produced heavy paper mulch in roll form. Typically this heavy paper mulch has a large degree of recycled paper content. Also, while this heavy paper mulch helps to block weed growth and is biodegradable, the paper is generally very stiff when dry and very weak when wet.

Recently, there has been interest in the use of bio-based materials. There are bio-based and biodegradable fabrics made from poly(lactic acid) (PLA) currently available on the market.

SUMMARY OF THE INVENTION

The present invention relates to a biodegradable landscape fabric comprising spunlaced cellulosic fibers which comprise 0% to 75% wood pulp fibers and 25% to 100% regenerated cellulosic fibers and without fiber binding materials. The biodegradable landscape fabric may further comprise a colorant.

DETAILED DESCRIPTION OF THE INVENTION

Definition of Terms

The term "biodegradable" as used herein describes the chemical dissolution of materials by bacteria or other biological means.

The term "spunlaced" as used herein describes a nonwoven manufacturing process of hydraulic entanglement of fibers to produce a nonwoven fabric, as disclosed, for example, by Bunting, Evans and Hook in U.S. Pat. Nos. 3,493,462, 3,508,308, 3,560,326 and 3,620,903.

The term "cellulosic fibers" as used herein describes fibers made from an organic compound derived primarily from plants such as trees.

The term "wood pulp fibers" as used herein describes a type of cellulosic fiber made from a lignocellulosic fibrous material prepared by chemically or mechanically separating cellulosic fiber from plants such as trees or cotton.

The term "regenerated cellulosic fibers" as used herein describes a type of cellulosic fiber made from wood pulp using a solvent fiber spinning process. The process involves dissolving wood pulp in a solvent, and spinning the resultant spinning solution into fibers.

DESCRIPTION

The present invention is directed to a biodegradable landscape fabric comprising spunlaced cellulosic fibers that can degrade over a single growing season. It is desired to develop a single season landscape fabric for use as garden mulch in, for example, a vegetable garden or an annual flower bed. The fabric protects against weed growth with or without a top covering of organic mulch, helps to retain moisture, is biodegradable in situ during a period of approximately one growing season and degrades sufficiently to be rototilled or otherwise plowed under at the end of the season. Additionally the fabric would be soft enough to generally conform to the ground contours, be easy to apply, be strong enough (dry or wet) to be walked upon and be compostable.

The fabric is made from a spunlaced process that hydraulically entangles cellulosic fibers to produce the fabric. The cellulosic fibers comprise 0% to 75% wood pulp fibers and 25% to 100% regenerated cellulosic fibers. The cellulosic fibers preferably comprise 25% to 75% wood pulp fibers and 25% to 75% regenerated cellulosic fibers. The wood pulp fibers are low cost, soft and easily colored. The regenerated cellulosic fibers of lyocell or rayon provide a suitable strength level. The strength of the fabric also arises from the entanglement of the fibers and thus precludes the need to add fiber binding materials such as adhesives or conjugate binder fibers.

In producing the fabric, the regenerated cellulose fibers are made into a web and typically consolidated by spunlacing. Wood pulp fiber in sheet form is then positioned onto the surface of the web of regenerated cellulose fibers. The combined web/sheet structure is further spunlaced to form a substantially unitary sheet structure having opposing surfaces that are wood pulp-rich and regenerated cellulose-rich.

The wood pulp-rich surface is usually darker in color than the cellulose-rich surface and as such, depending on the environment in which the fabric is used, there may be advantages as to which surface is "up", that is, which is exposed to the sunlight. For example, when the dark side is up the fabric becomes warm as the sunlight is absorbed. When it rains the fabric retains the water for a longer time. Without being held to any particular theory, it is believed that the absorbed heat and the significant moisture retention would help the plants to grow and develop their root structures.

When the lighter side is up, the fabric would be cooler by reflecting light. Again, without being held to any particular theory, it is believed this would be beneficial in the heat of summer or for generally hot climates so that the fabric does not get too hot and potentially burn plants and their root structure.

Optionally, a colorant such as a dye or pigment can be added to the cellulosic fibers to improve opacity and to provide an aesthetically pleasing color. The dye or pigment may also use a fixative or adhesive material to attach it to the cellulosic fibers but the fixative or adhesive material does not bond the cellulosic fibers together.

EXAMPLE

Hereinafter the present invention will be described in more detail in the following example.

A biodegradable landscape fabric of the present invention was made using a spunlaced process similar to the process disclosed in U.S. Pat. No. 4,442,161 to Kirayoglu and Zafiroglu, which is hereby incorporated by reference. The cellulosic fiber used was 55% softwood pulp fiber 44.4 g/m$^2$ Black MG Kraft (available from Thilmany Papers, Kaukauna, Wis.) and 45% lyocell regenerated cellulosic fiber Tencel® 1.7 dtex 20 mm bright nonwovens H405 969 (available from Lenzing Corp., Lenzing, Austria). The lyocell fiber was opened and made into a web of approximately 32 g/m². The web was consolidated by spunlacing. The softwood pulp fiber was fed in sheet form to a position atop the lyocell fiber web. The combined web/sheet structure was spunlaced to form a single sheet structure. The single sheet structure was dried, slit and wound up to form the resulting biodegradable landscape fabric. The biodegradable landscape fabric had a basis weight of 71 g/m².

The biodegradable landscape fabric of the Example was soft enough to generally conform to the ground contours, was easy to apply and was strong enough dry or wet to be walked upon. The fabric protected against weed growth with or without a top covering of organic mulch, helped retain moisture, was biodegradable in situ during a period of approximately one growing season, and degraded sufficiently to be rototilled under at the end of the season.

What is claimed is:

1. A biodegradable landscape fabric, comprising
spunlaced cellulosic fibers which comprise 25% to 75% wood pulp fibers and 25% to 75% regenerated cellulosic fibers and without fiber binding materials,
the biodegradable landscape fabric being about 55% softwood pulp fibers and about 45% spunlaced regenerated cellulosic fiber,
the softwood pulp fibers combined on top of the spunlaced regenerated cellulosic fiber forming a dried combined sheet;
the combined sheet spunlaced together into a single consolidated sheet;
the single consolidated sheet of biodegradable landscape fabric being substantially cellulosic.

2. The biodegradable landscape fabric according to claim 1, wherein the regenerated cellulosic fibers are selected from the group consisting of lyocell and rayon.

3. The biodegradable landscape fabric according to claim 1, comprising of colorant.

4. A biodegradable landscape fabric, comprising
at least a portion of the biodegradable landscape fabric including at least about 25% to 75% wood pulp fibers and including at least about 25% to 75% regenerated cellulosic fibers and without fiber binding materials,
wherein the biodegradable landscape fabric includes about 55% softwood pulp fibers at about 44.4 g/m2 and about 45% lyocell spunlaced regenerated cellulosic fiber at about 32 g/m2;
the softwood pulp fibers combined on top of the lyocell fiber to form a combined sheet;
the combined sheet spunlaced together into a single combined sheet;
wherein the biodegradable landscape fabric has a basis weight of about 71 g/m2.

5. A method of making a biodegradable landscape fabric, comprising:
spunlacing into a web lyocell fiber at about 32 g/m2;
forming into a sheet softwood pulp fibers at about 44 g/m2;
combining the sheet of softwood pulp fibers to a position on top of the lyocell web;
spunlacing the combined sheets of softwood pulp fibers and lyocell web into a single sheet;
drying the single sheet;
forming the dried single sheet into a biodegradable landscape fabric having a basis weight of about 71 g/m2.

* * * * *